Jan. 11, 1966     J. C. FAILING     3,228,487
HYDRAULICALLY OPERATED EARTH BORING TOOLS
Filed Nov. 5, 1962     6 Sheets-Sheet 1

INVENTOR.
JAY C. FAILING
BY
Alfred R. Fuchs
ATTORNEY

Jan. 11, 1966   J. C. FAILING   3,228,487
HYDRAULICALLY OPERATED EARTH BORING TOOLS
Filed Nov. 5, 1962   6 Sheets-Sheet 2

INVENTOR.
JAY C. FAILING
BY
Alfred R. Fuchs
ATTORNEY

Jan. 11, 1966 J. C. FAILING 3,228,487
HYDRAULICALLY OPERATED EARTH BORING TOOLS
Filed Nov. 5, 1962 6 Sheets-Sheet 3

INVENTOR.
JAY C. FAILING
BY
Alfred R. Fuchs
ATTORNEY

Jan. 11, 1966    J. C. FAILING    3,228,487
HYDRAULICALLY OPERATED EARTH BORING TOOLS
Filed Nov. 5, 1962    6 Sheets-Sheet 4

INVENTOR.
JAY C. FAILING
BY Alfred R. Fuchs
ATTORNEY

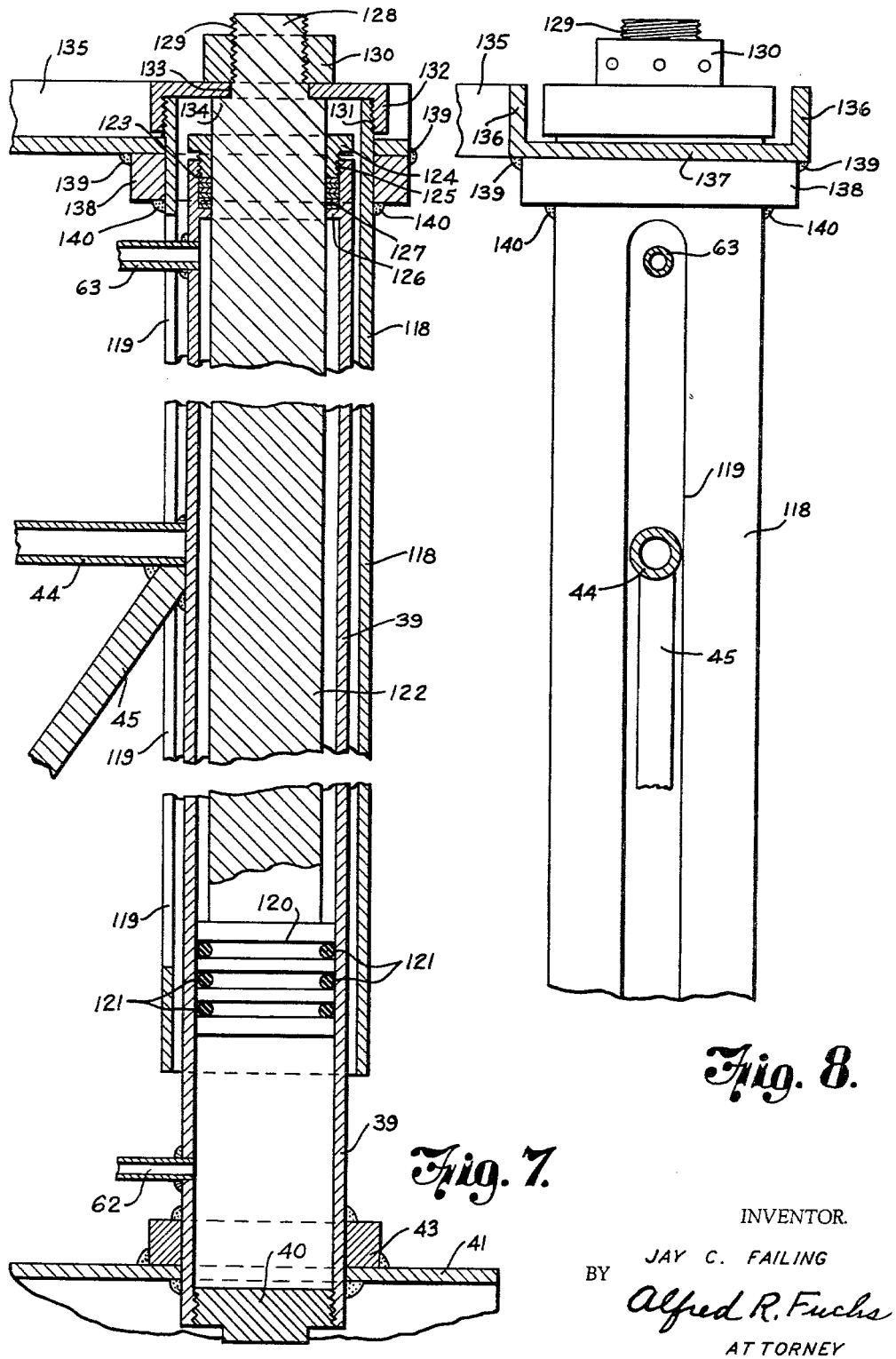

Jan. 11, 1966 J. C. FAILING 3,228,487
HYDRAULICALLY OPERATED EARTH BORING TOOLS
Filed Nov. 5, 1962 6 Sheets-Sheet 6

INVENTOR.

JAY C. FAILING

BY Alfred R. Fuchs

ATTORNEY

United States Patent Office 3,228,487
Patented Jan. 11, 1966

3,228,487
HYDRAULICALLY OPERATED EARTH
BORING TOOLS
Jay C. Failing, Encino, Calif., assignor to G-K Industries,
Inc., Enid, Okla., a corporation of Oklahoma
Filed Nov. 5, 1962, Ser. No. 235,924
6 Claims. (Cl. 173—152)

My invention relates to earth boring tools and more particularly to hydraulically operated earth boring tools.

My invention is particularly adapted for us in connection with earth boring tools that have driving means such as disclosed in my Patent Nos. 2,963,274, patented December 6, 1960, and 3,009,521, patented November 21, 1961. In earth boring tools utilizing such a driving means as shown in said patents, a drive sleeve is provided, which is mounted on a suitable supporting member or platform that is movable up and down along the framework or mast of the drilling apparatus. One of the important purposes of my invention is to provide hydraulic means for moving such a supporting member or platform longitudinally of or up and down a mast of a drilling apparatus. It is particularly adaptable for use with a drilling apparatus that comprises a drive shaft that extends longitudinally of the mast and which is held against movement lengthwise of itself with respect to the mast, and a drive sleeve mounted on the supporting member or platform, which drive shaft is provided with means that is slidable along the same for rotating the drive sleeve in any position of the platform as it is moved lengthwise of the mast. Furthermore my invention is particularly useful in connection with a structure such as shown in either of the above referred to patents, in which the drive sleeve is mounted to swing about an axis extending transversely of the sleeve, the sleeve being mounted for rotation about its axis and against movement relative to the supporting member or platform in an axial direction with respect to the drive sleeve.

It is a more specific purpose of my invention to provide, in earth boring apparatus, a mast that is provided with a hydraulic cylinder that extends lengthwise of the mast, that is provided with a piston which is rigidly connected with the support member or platform so as to move therewith, and means for supplying hydraulic fluid to the cylinder adjacent the opposite ends thereof, to move the support or platform either up or down lengthwise of the mast, as may be desirable. As disclosed in the aforementioned patents, the platform is moved downwardly to feed the drill bit into the earth and is moved upwardly to return the drive sleeve mounted on the platform to its elevated position after a length of drill pipe has been attached thereto, so that the added length of drill pipe can be connected with the drill pipe that is already attached to the bit, the securing of the additional length of drill pipe to the drive sleeve being readily accomplished while the drive sleeve is in a lowered position due to the swinging mounting of the sleeve on the platform or other supporting member.

In the preferred form of my invention a pair of hydraulic cylinders is utilized, which form a pair of the legs of the mast, and said mast further comprises a pair of legs that are spaced from the hydraulic cylinders that form the one pair of legs and secured thereto by means of transversely extending connecting frame members, some of which extend obliquely and some perpendicularly to the axes of the legs.

It is a further purpose of my invention to provide means for moving a supporting member lengthwise of a mast that is provided with such hydraulic cylinders, comprising tubular members that are rigidly connected with the supporting member at their lower ends and which embrace the hydraulic cylinders, and to provide means for connecting the pistons in the cylinders with the upper ends of said tubular members by means of piston rods that extend from the pistons upwardly through suitable fluid tight sliding joints at the upper ends of the cylinders, with the upper ends of said rods connected rigidly with the upper ends of the tubular members that embrace the cylinders.

It is a further purpose of my invention to provide means for guiding the platform or other supporting member in its movements lengthwise of the mast and to provide means for bracing and guiding the structure that connects the pistons with the tubular members that embrace the cylinders and thus with the supporting member or platform, said means comprising a bracing member that rigidly connects the upper ends of the tubular members and has guiding means engaging with the tubular legs of the mast.

It is a further important purpose of my invention to to provide a mast of the above referred to character with a mounting on a base that is of such a character that the mast can be moved between a substantially horizontal position and a substantially vertical position and can be adjusted to a position that is at an oblique angle to its horizontal position and locked in such obliquely extending direction, or locked in such vertical position, thus permitting the drilling apparatus to be adjusted so as to drill a bore that extends at a desired oblique angle to the vertical or that extends vertically.

It is a further purpose of my invention to provide a base member with a pair of transversely spaced posts extending upwardly therefrom, having means at the upper ends thereof for mounting the mast to swing about a transverse axis near one end thereof, and hydraulic fluid actuated means for swinging the mast about this axis comprising hydraulic cylinders provided with the usual pistons therein, which hydraulic fluid actuated means is pivotally connected with the base and with the mast at a point spaced further than said pivotal mounting for the mast from the end thereof provided with said pivotal mounting, and to provide means for holding the mast in any adjusted angular position thereof with respect to the base, comprising locking plates rigidly mounted on the mast and having an arcuate series of openings therein, the center of the arc on which the same are located being on the pivotal axis of the mast, and brackets mounted on the base each having an opening with which any one of the arcuate series of openings is adapted to be aligned, and cooperating therewith a fastening element that extends through the aligned openings and secures the mast fixed in its desired angular position with respect to the base.

Other objects and advantages of my invention will appear as the description of the drawings proceeds. I desire to have it understood, however, that I do not intend to limit myself to the particular details shown or described, except as defined by the claims.

In the drawings:

FIG. 7 is a fragmentary longitudinal sectional view through one of the hydraulic cylinders and parts associated therewith.

FIG. 8 is a fragmentary view partly in section and partly in elevation of the upper end portion of the hydraulic cylinder shown in FIG. 7 and parts connected therewith.

Figure 4:
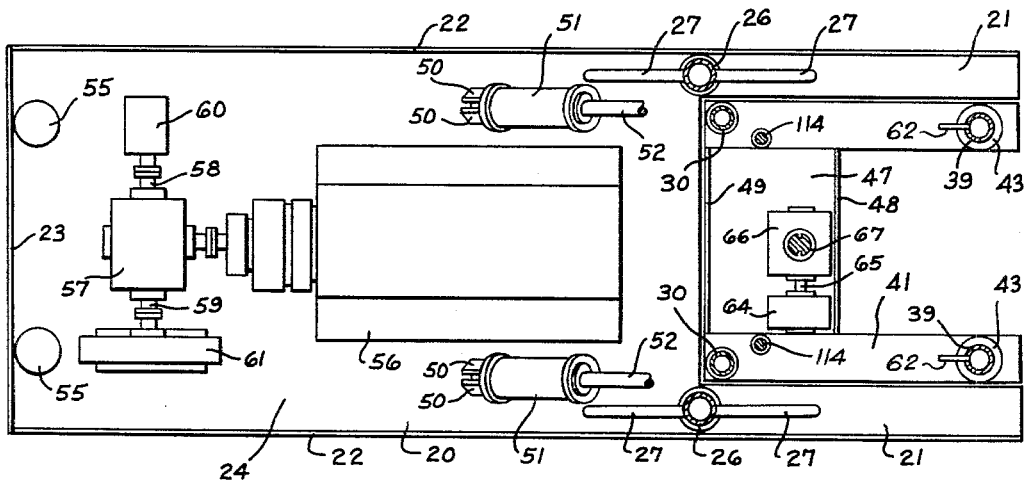
FIG. 4 is a section taken on the line 4—4 of FIG. 1 on an enlarged scale.

Referring in detail to the drawings, my improved earth boring apparatus comprises a base member 20, which is provided with a pair of narrow extensions 21 providing an opening at one end thereof between said extensions. Said base member is provided with a pair of upstanding side flanges 22, an end flange 23 and a horizontal wall 24. Extending longitudinally of said base member and into the extensions 21 thereof are channel members 25, which serve as longitudinal frame members for said base. Extending upwardly from the base 20 and secured rigidly thereto at the lower ends thereof are upstanding posts 26, which are provided with flanges secured to the base member 20, as will be obvious from FIG. 4, and with diagonal bracing members 27 that are welded to said posts at their upper ends and to the base member 20 and its extensions 21 at the lower ends thereof to thus rigidly mount the posts on the base 20 in upstanding relation thereto.

The upper ends of the posts 26 are provided with bearings 28 for pivot members 29, which are mounted on the tubular legs 30 of the mast, each mounting comprising a plate 31, which is welded to one of the legs 30 to which a bracket 32 is welded or otherwise secured in fixed position. One end of the pivot pin 29 is secured to said bracket 32 by means of a pin 33, the other end of said pivot pin 29 being provided with a collar 34, which is also pinned to the pivot pin 29 and between which collar and the bearing member 28 a washer 35 is interposed. The bearings 28 are preferably welded to the posts 28 and welded to each bearing member 28 is a bracket 36, which extends laterally from the bearing member 28. The plates 31 are each provided with an arcuate series of openings 37 extending therethrough, through which the shank of a headed screw-threaded member 38 is adapted to pass, said headed screw-threaded member having screw-threaded engagement with a threaded opening in the bracket 36.

The mast is also provided with a pair of longitudinally extending hydraulic cylinders 39 forming another pair of legs of said mast. The hydraulic cylinders 39 are provided with closure plugs 40 at the bottom ends thereof screw-threadedly connected with the tubular body portions of the hydraulic cylinders. A channel member 41 is secured to each of the hydraulic cylinders 39 adjacent the bottom end thereof and to the bottom end of each of the legs 30. The hydraulic cylinders 39 extend through the webs of the members 41 and are welded thereto, as shown in FIG. 7. Collars 43 are mounted on the channel members 41 and secure said channel members to the bottom ends of the cylinders 39, being welded to the channel members 41 and cylinders 39. Each of the hydraulic cylinders 39 is connected with a tubular leg 30 by means of frame members 44 that extend perpendicularly to the axes of the members 30 and 39 and obliquely extending frame members 45, all said frame members 44 and 45 being rigidly secured to the legs 30 and to the hydraulic cylinders 39, as by welding. Frame members 46 are also provided connecting the pair of tubular legs 30 and are rigidly connected to said tubular legs, as by welding. A plate 47 is also provided extending between the channels 41 and secured thereto, said plate providing a platform for the mounting of certain mechanism on the mast at the bottom end thereof, said plate 47 having marginal stiffening flanges 48 and 49 thereon.

Figure 12:
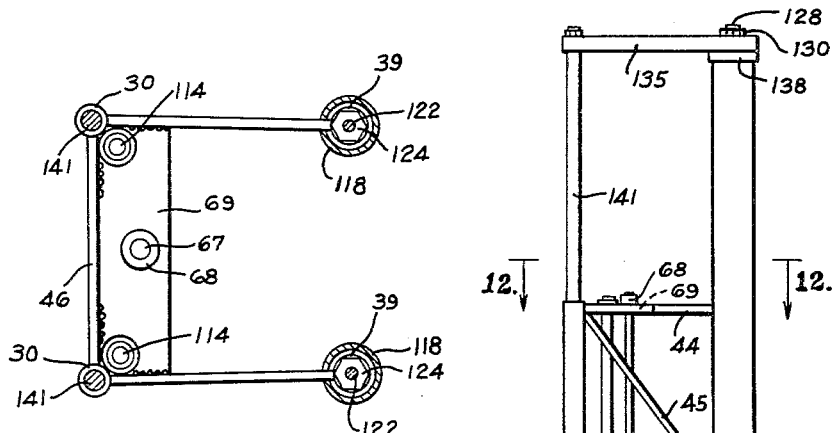
FIG. 12 is a section on a somewhat enlarged scale, taken on the line 12—12 of FIG. 1.
Figure 11:
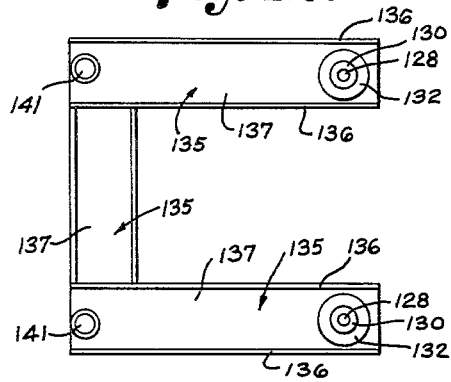
FIG. 11 is a top plan view of the bracing member provided at the upper end of the means for moving the platform longitudinally of the mast, and parts associated therewith.
Figure 1:
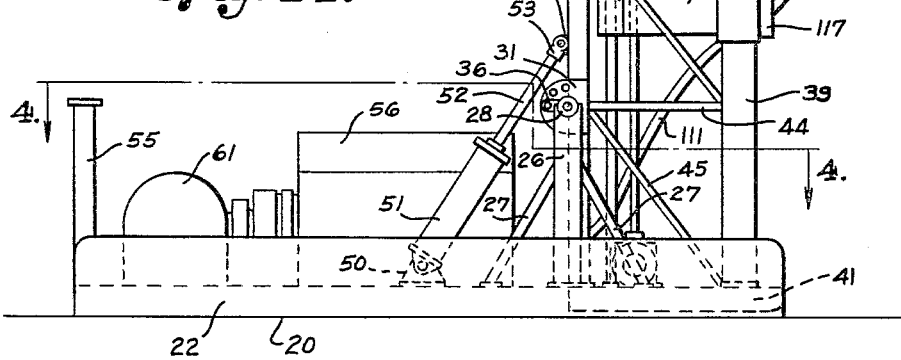
FIG. 1 is a view in side elevation of an earth boring apparatus embodying my invention, showing the mast in a vertical position.
Figure 2:
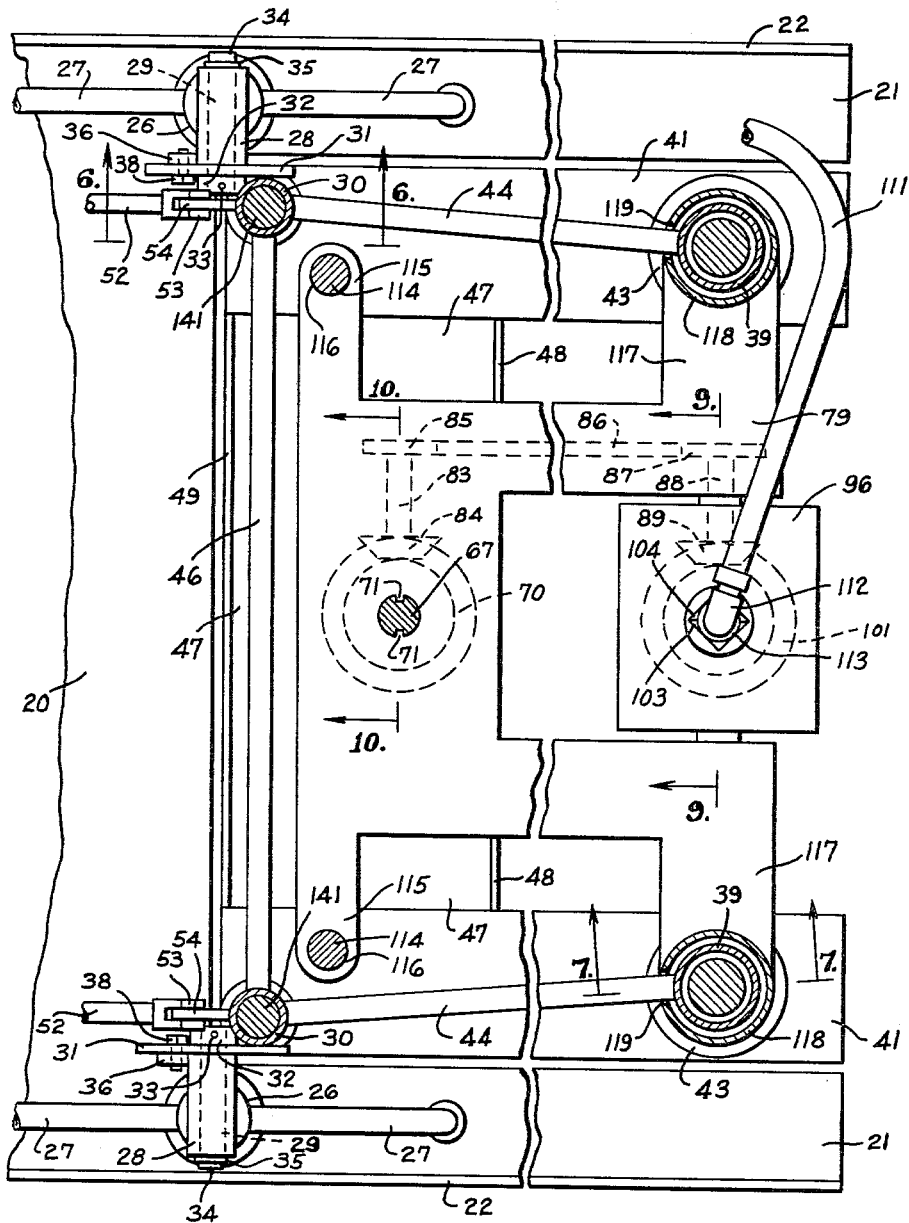
FIG. 2 is an enlarged horizontal sectional view partly broken away, taken on the line 2—2 of FIG. 1.
Figure 6:
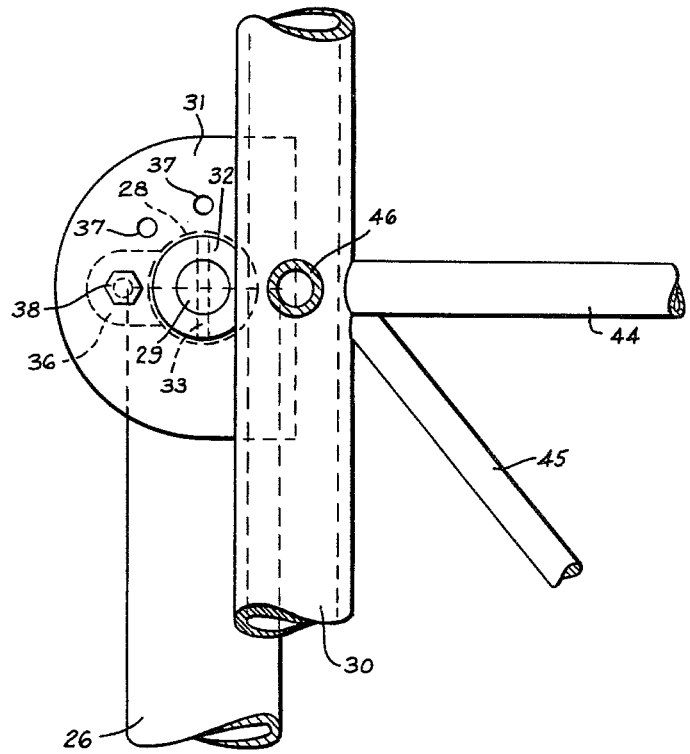
FIG. 6 is a fragmentary detail view partly in section and partly in elevation taken on the line 6—6 of FIG. 2.
Figure 3:
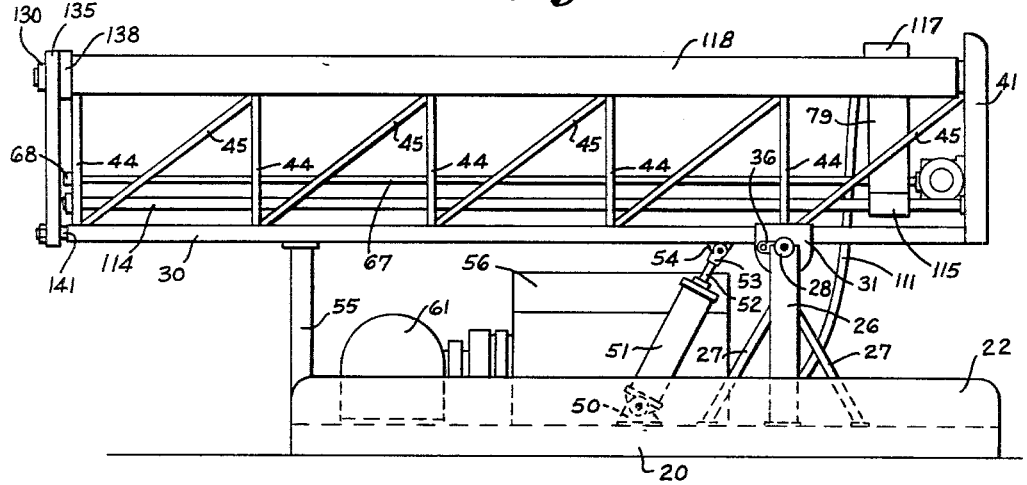
FIG. 3 is a view similar to FIG. 1 showing the mast in its lowered or horizontal position.
Figure 5:
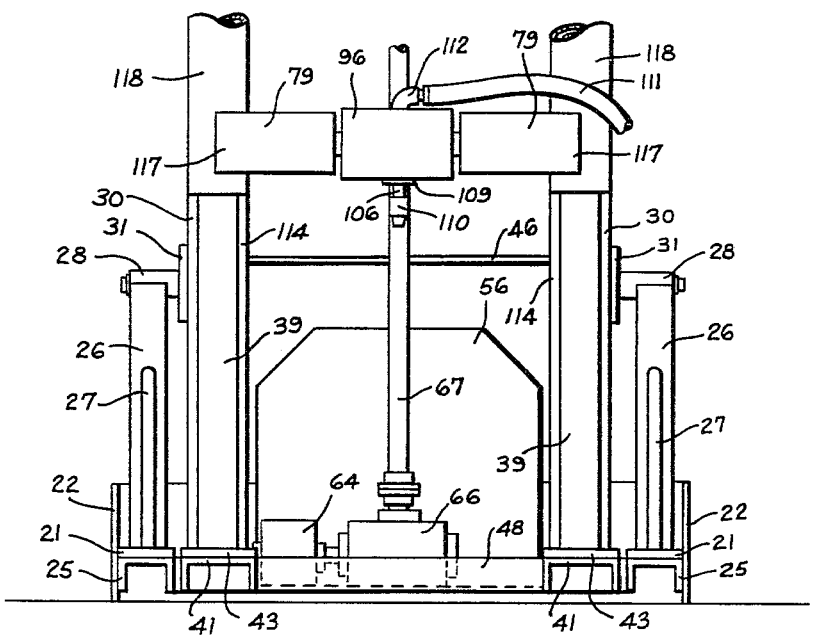
FIG. 5 is a fragmentary elevational view of the mast and base shown in FIG. 1, as viewed from the right hand side of FIG. 1.

Paired upstanding ears 50 are provided on the base plate 24 for pivotally mounting one end of each of the hydraulic cylinders 51 on the base member 20. The pistons provided in the hydraulic cylinders 51 are provided with piston rods 52 extending from the upper ends of the hydraulic cylinders 51, said piston rods 52 being provided with bifurcated heads 53 thereon that are pivotally connected with ears 54 rigidly secured to the legs 30 of the mast. Suitable connections are provided with the hydraulic cylinders 51 for introducing hydraulic fluid into said cylinders at opposite ends thereof in a well known manner to move the pistons therein either up or down in said hydraulic cylinders as may be desired. It will be obvious that the hydraulic cylinders 51 are adapted to move the mast from the horizontal position shown in FIG. 3 with the frame members 30 thereof resting on the upper ends of the posts 55 that extend upwardly from the base member 20 to the vertical position thereof shown in FIG. 1. Also it will be obvious that the swinging of the mast about the pivot members 29 can be halted at any desired angular position with respect to the base member and the headed fastening member 38 inserted through an appropriate opening in each of the plates 31 to hold said mast in such angular position, the number of holes 37 shown in the drawings being merely illustrative, it being obvious that any number of holes can be provided in the end plate as may be found necessary to get the desired angular positions of the mast.

Any suitable means may be provided for supplying the hydraulic fluid to the hydraulic cylinders 51, the drawings showing a prime mover, such as an internal combustion engine 56, which is conected with a suitable transmission 57, which is provided with shafts 58 and 59 extending therefrom, the shaft 58 driving the pump 60 for supplying the hydraulic fluid to the hydraulic cylinders 51 as well as to the hydraulic cylinders 39. The shaft 59 is shown as being connected with a drilling fluid pump 61. Suitable piping conections are provided between the hydraulic pump 60 and the cylinders 39 and 51 and well known valve means may be provided so that the one end of each of the cylinders will be connected with the inlet connection of the pump when the other end thereof is connected with the outlet connection thereof. The cylinders 39 are shown as being provided with hydraulic fluid conduits 62 and 63 at the opposite ends thereof for supplying hydraulic fluid to and withdrawing hydraulic fluid from the opposite ends of the cylinders 39. Also suitable piping connections are provided for connecting the hydraulic pump with a hydraulic motor 64, which is mounted on the plate 47 and which is provided with a shaft 65 connecting it with a transmission 66, from which the kelly 67 extends, a suitable thrust bearing being provided in the transmission 66 for said kelly 67 so that it does not have any endwise movement with respect to the mast.

The upper end of the kelly 67 is rotatably mounted in a suitable bearing 68 which is mounted in a mounting member 69 mounted on the mast. Mounted on the shaft or kelly 67 between the bearing 68 and the transmission 66, is the bevel gear 70. Said gear 70 is longitudinally slidably mounted on the kelly 67 to rotate therewith, the kelly being shown as being provided with longitudinal grooves 71 therein, and the gear 70 being provided with a pair of grooves 72 therein, that are adapted to align with the grooves 71, keys 73 being mounted in said grooves 71 and 72. A plate 74 secured detachably to the hub of the gear 70 is provided for confining the keys within the grooves 72. The gear 70 is mounted between suitable bearings 75 and 76 that are mounted in the bottom wall 77 and top wall 78, respectively, of a movable platform or supporting member 79. The platform 79 is mounted for movement longitudinally of the mast in a manner to be described below.

Mounted in bearing means 80 and 81 provided with a suitable mounting 82 on the platform 79 in a stub shaft 83. On one end of the shaft 83 mounted to rotate therewith is a bevel pinion 84, which meshes with the gear 70, and mounted on the other end of the shaft 83 to rotate therewith is a sprocket 85 over which the sprocket chain 86 passes. The sprocket chain 86 also operates over a sprocket wheel 87 that is mounted on a stub shaft 88 to rotate therewith and said stub shaft 88 is provided with a bevel pinion 89, that is also mounted to rotate therewith. Sleeves 90 are mounted pivotally in bearings 91 in the vertical walls 92, that connect the top wall 78 and the bottom wall 77 of the platform 79. Each of said sleeves 90 is also provided with a flange 93 at one end thereof, which is secured to an annular flange 94 projecting from the vertical wall 95 of a housing 96. The sleeves 90 thus serve as trunnions or pivot members on which the housing 96 is adapted to turn on the platform or supporting member 79. One of said sleeves 90 also acts as a bearing member for the shaft 88. The shaft 88 thus rotates on the axis of the pivotal mounting of the housing 96 on the platform 79. Mountings 97 and 98 are provided on the housing 96 for bearing members 99 and 100 that mount the bevel gear 101 rotatably in the housing 96, to rotate about an axis perpendicular to the pivotal axis of the housing 96 on the platform 79.

Figure 9:
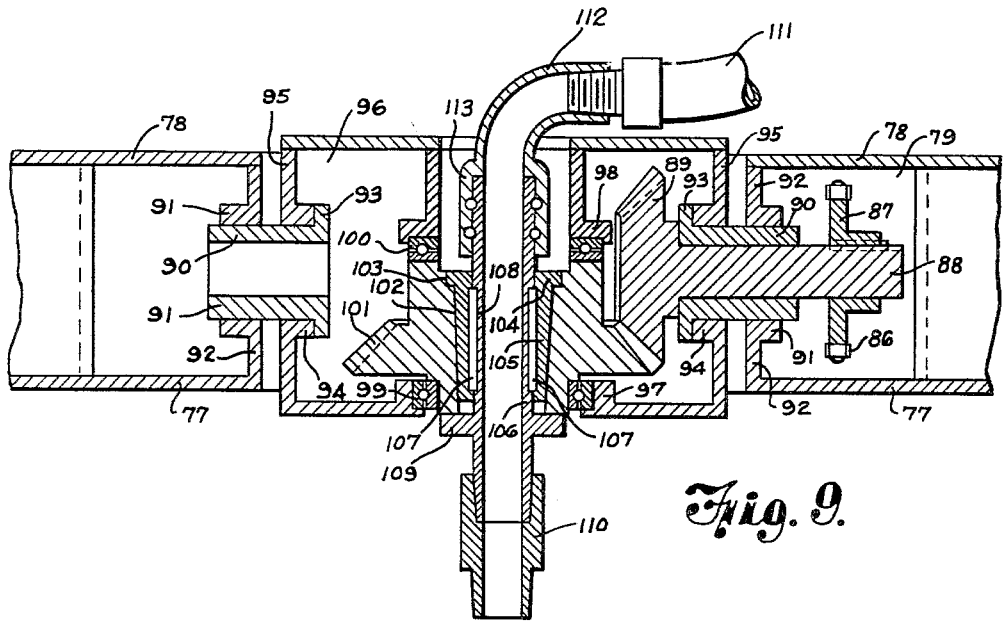
FIG. 9 is an enlarged fragmentary sectional view taken on the line 9—9 of FIG. 2.
Figure 10:
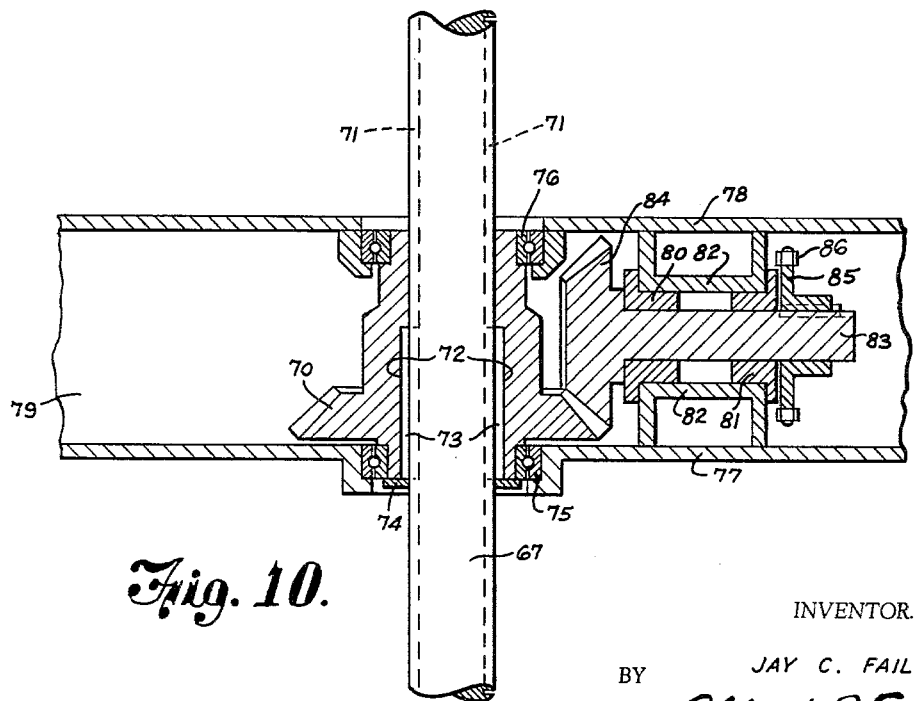
FIG. 10 is an enlarged fragmentary sectional view taken on the line 10—10 of FIG. 2.

It will accordingly be evident that, as the shaft or kelly 67 is rotated, the gear 101 will be rotated through the driving connection described above, no matter what the position of the gear 70 on the kelly 67 may be. The gear 101 is provided with a central axial opening 102 leading from a rectangular opening 103, with which the flanges 104 on the slips 105 engage. It will be noted that the slips 105 are tapered as shown in FIG. 9 and that the opening 102 is similarly tapered. A drive sleeve 106 is mounted within the opening in the gear 101 and keys 107 fix the drive sleeve 106 to the gear 101 to rotate therewith, said keys 107 being interposed between the slips 105 and the drive sleeve 106 and being mounted in suitable grooves 108 in said drive sleeve. A flange 109 is provided on the drive sleeve 106 engaging the hub of the gear 101, the drive sleeve and gear being thus held from relative movement axially of the drive sleeve. Said drive sleeve 106 is provided with suitable coupling means 110 thereon for connection with suitable means on a drill pipe to couple the drill pipe thereto, as described in my Patent No. 2,963,274. The drilling fluid is supplied to the drill pipe from any suitable source of supply by means of the pump 61 and suitable connections including a flexible conduit 111 and the water swivel 112, which is provided with a ball bearing connection 113 with the drive sleeve 106.

The platform 79 and the housing 96 thus provide a support for the drive sleeve, on which the drive sleeve is mounted for rotation about its axis and for swinging movement about an axis perpendicularly to the axis of rotation thereof. The platform 79 is mounted for movement longitudinally of the mast and suitable guiding means is provided for said platform 79 on said mast. A pair of guide members 114 is provided on the mast, extending from and secured to the base 20 and the mounting member 69 at the upper end portion of said mast. Said platform 79 is provided with a pair of extensions 115, which are provided with openings 116 in which said guide members 114 are received to slidably mount said platform on said guide members 114. Said platform is also provided with a pair of lateral extensions 117, with which the tubular members 118 are connected, said tubular members 118 being secured rigidly to the extensions 117, as by welding. Each of the tubular members 118 is provided with a longitudinally extending slot 119, each of said tubular members 118 embracing one of the hydraulic cylinders 39, the slot 119 being provided for accommodation of the bracing members 44 and 45 extending from said hydraulic cylinder as well as the conduits 62 and 63 extending therefrom. Said tubular members 118 thus act as additional guiding means for the platform 79.

Referring now to FIGS. 7 and 8, the hydraulic cylinder 39 has a piston 120 slidably mounted therein, suitable sealing means 121 being provided on said piston. Extending from the piston is a piston rod 122, which extends through the open end 123 of the hydraulic cylinder 39. Suitable means is provided for obtaining a fluid tight sliding connection between the hydraulic cylinder and the piston rod 122, comprising a flanged sleeve 124 slidably receiving the rod 122 and which is provided with screw-threads 125 that engage the internal threads on the open end of the hydraulic cylinder 39 and between which and an inwardly directed flange 126 on the hydraulic cylinder 39 packing material 127 is provided. Thus a sliding joint is provided between the piston rod 122 and the cylinder 39 at the upper end thereof which is fluid tight. The upper end of the piston rod 122 is provided with a reduced portion 128, which is screw-threaded as at 129, to receive a screw-threaded nut 130.

The upper end portion of the slotted sleeve or tubular member 118 is provided with an externally threaded portion 131, with which the internal threads on the cap 132 engage. The reduced extension 128 of the piston rod 122 extends through an opening 133 in the cap member 132 and said cap member 132 is seated against the shoulder 134 provided between the main body portion of the piston rod 122 and the extension 128 thereof, the nut 130 clamping the parts rigidly to each other. Thus each of the longitudinally slotted tubular members 118 is secured rigidly to the piston 120 in the cylinder 39, which it embraces, so that piston 120 and said tubular member 118 will work together as a unit. To further brace the movable structure comprising the slotted tubular members 118 and the platform 79, transverse bracing means 135 is provided at the upper end of the structure. Said bracing means comprises channel-shaped portions having the flanges 136 and the web portions 137. A ring 138 embraces each of the split tubular members 118 near the upper end thereof and is in engagement with the under side of a web portion 137, said ring 138 being secured to the bracing member 135 and to the split tubular members by means of welds 139 and 140. Mounted in fixed position on the bracing member 135 and extending downwardly therefrom are the guide bars 141, which are slidably mounted within the tubular members 30 of the mast.

From the foregoing it will be obvious that the platform 79 carrying the drive sleeve 106, is adapted to be moved up and down on the mast by supplying hydraulic fluid to the selected ends of the cylinders 39, the platform moving with the pistons 120, and the slotted tubular members 118 connected therewith. It will further be obvious that the drive sleeve can be swung on its trunnions to any desired position in any of the positions of the platform 79 along the length of the mast. Also, by provision of the hydraulic cylinders 51 for elevating and lowering the mast, the mast can be moved to any desired angular position with respect to the base 20 and locked in such position by means of the locking plates 31, the brackets 36 and the headed fastening elements 38.

What I claim is:

1. In earth boring apparatus, a mast, a drive shaft extending longitudinally of said mast, a supporting member mounted on said mast for movement longitudinally of said mast, a drive sleeve mounted on said supporting member to swing about an axis extending transversely of said sleeve, said sleeve being mounted for rotation about its axis and against movement relative to said supporting member axially of said drive sleeve, a driving connection between said shaft and drive sleeve, and means for moving said supporting member longitudinally of said mast comprising a pair of transversely spaced hydraulic cylinders incorporated in said mast, a pair of transversely spaced tubular members rigidly connected adjacent one end thereof with said supporting member and each embracing one of said cylinders, said mast having a pair of tubular legs transversely spaced substantially equidistantly from each other and from said cylinders, a bracing structure connecting said tubular members at the other ends thereof, guiding means on said bracing structure engaging said tubular legs in spaced relation to said tubular members and cooperating guiding means on said supporting member and said mast in transversely spaced relation to said cylinders and tubular members, a piston in each of said cylinders, rigid means connecting said pistons with said tubular members and means for supplying hydraulic fluid to said cylinders adjacent the opposite ends thereof.

2. In earth boring apparatus, a mast, a drive shaft extending longitudinally of said mast, a supporting member mounted on said mast for movement longitudinally of said mast, a drive sleeve mounted on said supporting member to swing about an axis extending transversely of said sleeve, said sleeve being mounted for rotation about its axis and against movement relative to said supporting member axially of said drive sleeve, a driving connection between said shaft and drive sleeve, and means for moving said supporting member longitudinally of said mast comprising a hydraulic cylinder incorporated in said mast, an elongated tubular member rigidly connected with said supporting member and extending upwardly therefrom and embracing said cylinder, a piston in said cylinder and rigid means connecting said piston with said tubular member comprising a piston rod of approximately the length of said tubular member extending through the upper end of said cylinder from said piston, means providing a fluid tight sliding joint between said piston rod and said upper end of said cylinder, means rigidly detachably connecting the upper ends of said piston rod and said tubular member comprising a closure member for the upper end of said tubular member, and means for supplying hydraulic fluid to said cylinder adjacent the opposite ends thereof.

3. In earth boring apparatus, a mast, a drive shaft extending longitudinally of said mast, a supporting member mounted on said mast for movement longitudinally of said mast, a drive sleeve mounted on said supporting member to swing about an axis extending transversely of said sleeve, said sleeve being mounted for rotation about its axis and against movement relative to said supporting member axially of said drive sleeve, a driving connection between said shaft and drive sleeve, and means for moving said supporting member longitudinally of said mast comprising a pair of transversely spaced hydraulic cylinders incorporated in said mast to form a pair of legs of said mast, a pair of transversely spaced slotted elongated tubular members each embracing one of said cylinders, said tubular members being rigidly secured adjacent one end thereof to said supporting member and extending upwardly therefrom, a piston in each of said cylinders, means rigidly connecting each of said pistons with one of said tubular members at one end thereof comprising a piston rod of approximately the length of said tubular member extending through the upper end of said cylinder, means providing a fluid tight sliding joint between said piston rod and the upper end of said cylinder, means rigidly detachably securing the upper ends of said piston rods to the upper ends of said tubular members, transverse bracing means connecting said tubular members adjacent the upper ends thereof, transverse frame members on said mast engaging in said slots in said tubular members, and means for supplying hydraulic fluid to said cylinders adjacent the opposite ends thereof.

4. In earth boring apparatus, a mast having a pair of longitudinally extending transversely spaced hydraulic cylinders forming a pair of legs thereof, said mast having a second pair of legs transversely spaced substantially equidistantly from each other and from said cylinders, transverse frame members connecting each of said cylinders with one of said legs of said second pair at the ends thereof and at spaced points between said ends, a piston in each of said cylinders, a rod extending from each piston through the upper end of the cylinder having said piston, closure means at the upper ends of said cylinders each having an opening slidably receiving one of said rods, means providing a fluid tight joint between said rods and closure means, means for supplying hydraulic fluid to said cylinders adjacent the opposite ends thereof, an elongated tubular member of approximately the length of said rod embracing each of said cylinders and detachably secured at the upper end thereof to the upper end of one of said rods to move therewith, a platform secured to the bottom ends of said tubular members to move therewith, a drive sleeve mounted on said platform to move therewith, and means for rotating said drive sleeve.

5. In earth boring apparatus, a mast having a pair of longitudinally extending transversely spaced hydraulic cylinders forming a pair of legs thereof said mast having a second pair of legs transversely spaced substantially equidistantly from each other and from said cylinders, transverse frame members connecting each of said cylinders with one of said legs of said second pair at the ends thereof and at spaced points between said ends, a piston in each of said cylinders, a rod extending from each piston through the upper end of the cylinder having said piston, closure means at the upper ends of said cylinders each having an opening slidably receiving one of said rods, means providing a fluid tight joint between said rods and closure means, means for supplying hydraulic fluid to said cylinders adjacent the opposite ends thereof, an elongated tubular member of approximately the length of said rod embracing each of said cylinders and detachably secured at the upper end thereof to the upper end of one of said rods to move therewith, a transverse bracing member secured in fixed position to said tubular members at the upper ends thereof, cooperating guiding means on said transverse bracing member and said mast transversely spaced from said tubular members, a platform secured to the bottom ends of said tubular members to move therewith, cooperating guiding means on said platform and mast spaced laterally from said tubular members, a drive sleeve mounted on said platform to move therewith, and means for rotating said drive sleeve.

6. In earth boring apparatus a base member, a pair of transversely spaced posts extending upwardly from said base member, a mast comprising a pair of transversely spaced tubular legs, a pair of hydraulic cylinders spaced substantially equidistantly therefrom and from each other and forming another pair of legs thereof, frame members connecting said tubular legs with said cylinders, means at the upper ends of said posts pivotally mounting said tubular legs thereon to mount said mast to swing about a transverse axis near one end thereof, means for swinging said mast about said axis, means for locking said mast in any selected angular position with respect to said base member between a horizontally extending position and a vertically extending position of said mast, a pair of slotted elongated tubular members each embracing one of said cylinders with said frame members engaging in said slots, a platform mounted on said mast for movement longitudinally of said mast, a drive sleeve mounted on said platform to move therewith, means for rotating said drive sleeve, said slotted tubular members being rigidly secured to said platform at the lower ends thereof, pistons in said cylinders, means for supplying hydraulic fluid to said cylinders adjacent the opposite ends thereof, a rod of approximately the length of said tubular member extending from each piston through the upper end of the cylinder having said piston, closure means at the upper ends of said cylinders each having an opening slidably receiving one of said rods, means providing a fluid tight joint between said rods and closure means, means for rigidly securing the upper ends of said rods to the upper ends of said slotted tubular members, a transverse bracing member secured in fixed position to said slotted members at the upper ends thereof, cooperating guiding means on said platform and mast spaced laterally from said tubular members, and guiding means on said transverse bracing member comprising a pair of rods extending from said bracing member in spaced relation to said tubular members and slidably engaging in said tubular legs.

References Cited by the Examiner

UNITED STATES PATENTS

| | | | |
|---|---|---|---|
| 1,477,749 | 12/1923 | Dobson | 173—39 |
| 2,030,512 | 2/1936 | Hansen | 173—44 |
| 2,321,680 | 1/1943 | Houston | 173—140 |
| 2,334,312 | 11/1943 | Caldwell | 173—44 |
| 2,792,198 | 5/1957 | Braun | 173—28 |
| 2,792,689 | 5/1957 | Phares | 173—39 |
| 2,838,282 | 6/1958 | Colquitt | 173—44 |
| 3,009,521 | 11/1961 | Failing | 173—140 |

BROUGHTON G. DURHAM, *Primary Examiner.*

DON A. WAITE, *Examiner.*